3,657,382
PROCESSING AID FOR ABS RESINS
Adam Frank Kopacki, Westwood, N.J., assignor to Stauffer Chemical Company, New York, N.Y.
No Drawing. Filed July 1, 1970, Ser. No. 51,716
Int. Cl. C08f *19/08, 15/40, 29/22*
U.S. Cl. 260—836                                     8 Claims

ABSTRACT OF THE DISCLOSURE

There is disclosed an improved ABS, i.e. acrylonitrile-butadiene-styrene, resin composition having improved processing characteristics as a result of the incorporation therein of a processing aid comprising a plurality of particles of polyacrylate-modified polyvinyl chloride.

BACKGROUND OF THE INVENTION

When converting an ABS resin, it ordinarily undergoes a fluxing step after which it is processed to its desired shape. It is, of course, necessary that the resin remain stable and free of discoloration at the high temperatures which are encountered during these processing and fluxing procedures. Additionally, the resin must yield under stress, it must have adequate flow properties and it must lend itself to milling and extrusion. Since modified ABS resins do not always possess all of these properties, it has been necessary or desirable to add various processing aids to the resin. For instance, acrylic ester polymers, such as a copolymer of methyl methacrylate and ethyl acrylate, in granular form, are dry-mixed with the ABS resin and then milled on a calender or extruded. However, such all acrylic processing aids are rather expensive products and the compositions resulting from their use are not always completely satisfactory with respect to their processing characteristics as well as other significant properties such as discoloration and loss of physical properties.

Thus, it is the prime object of this invention to provide improved ABS resin compositions by admixing ABS resins with a processing aid which is low in cost and whose use provides results superior to those presently attainable with processing aids based upon all acrylic polymers. Various other objects and advantages of this invention will be apparent upon reading the disclosure which follows hereinafter.

TECHNICAL DISCLOSURE OF THE INVENTION

The above stated objects are achieved by blending an ABS resin with a novel processing aid which comprises particles of PVC having moieties of an acrylate ester polymer polymerized in and/or on said PVC particles. Thus, the use of this processing aid in ABS resins has been found to result in the preparation of compositions whose processing characteristics and other physical properties are substantially superior to the results achieved with presently available processing aids which are intended for use with ABS resins. Moreover, this excellent processing aid contains a substantial concentration of PVC, i.e. polyvinyl chloride, and is, therefore, far less expensive than the processing aids based entirely upon acrylic polymers.

The ABS resins which can be used to prepare the novel compositions of this invention are, generally, of two different types, namely, types B and G. Type B ABS resins comprise a mechanical blend, i.e. a mixture, of a 60 to 80:40 to 20 styrene (or alpha-methyl styrene):acrylonitrile copolymer with from about 10 to 40%, by weight, of a 5 to 40:95 to 60 acrylonitrile:butadiene copolymer. Type G ABS resins comprise a mixture of a 60 to 80:40 to 20 styrene (or alpha-methyl styrene):acrylonitrile copolymer with from about 10 to 40%, by weight, of a graft of the latter styrene (or alpha-methyl styrene:acrylonitrile copolymer onto either polybutadiene or a copolymer of butadiene with from about 1 to 40%, by weight of either styrene or acrylonitrile; the total concentration of the polybutadiene or butadiene copolymer in the resin being from about 5–35% of its total weight. These ABS resins are all prepared by means of procedures well known to those skilled in the art. A thorough discussion of these products and their preparation may be found in "ABS Plastic" by Basdekis, published in 1964 by Reinhold Publishing Co., New York, N.Y. as part of the Reinhold Plastic Application Series.

The processing aids used in preparing the improved ABS resin compositions of this invention may be broadly described as polyacrylate-modified polyvinyl chloride. More particularly, they comprise particles of polyvinyl chloride having polyacrylate ester moieties polymerized in and/or on said particles. The polyacrylate ester moieties may comprise from about 80 to 100%, by weight, of polymethyl methacrylate together with from about 20 to 0%, by weight, of one or more optional methyl methacrylate copolymer moieties. These polyacrylate ester moieties are present in these processing aid particles in a concentration of from about 10–60%, by weight, of the polyvinyl chloride.

The preparation of these novel polyacrylate-modified polyvinyl chloride processing aids is described, in detail, in copending application Ser. No. 43,568, filed June 4, 1970, in the names of Kraft, Brunner and Kopacki, said application being assigned to the assignee of the subject application. The disclosure of the latter application is here incorporated by reference.

Thus, the preparation of these processing aids is accomplished by means of a process which broadly comprises suspension polymerizing vinyl chloride under conditions whereby polyvinyl chloride is obtained in a certain particle size range by means of a conventional, free radical initiated, suspension polymerization at a controlled rate of agitation and in the presence of a specified concentration of a suspending agent; removing unreacted vinyl chloride from the system after polymerization is at least 60%, complete; adding to the system an effective concentration of a chain transfer agent and a minor proportion, i.e. up to about 50% by total solids weight of an acrylate ester monomer comprising methyl methacrylate and up to about 25% of its weight of one or more optional comonomers, as hereinafter defined, said monomer or monomers having first been pre-mixed with a fresh supply of an effective concentration of a monomer soluble, free radical catalyst; continuing the polymerization until the thus added methyl methacrylate, and any optional comonomers added therewith, are polymerized in and/or on the particles of the previously polymerized PVC; and, separating the polyacrylate-modified polyvinyl chloride thereby obtained. Apparently, the thus added acrylate ester monomer, i.e. the methyl methacrylate and any optional comonomers, are absorbed by and polymerized in and/or on the initially prepared polyvinyl chloride particles so as to thereby produce a polyacrylate-modified PVC resin which acts as an effective processing aid for blending with ABS resins.

Moreover, it has been found that the utilization, in the preparation of these processing aids of: (1) The step of completely removing any unreacted vinyl chloride monomer prior to introducing and initiating the polymerization of the MMA and (2) the step of pre-mixing the MMA, and any optional monomers, with fresh catalyst as well as (3) the use of a chain transfer agent during the polymerization of the MMA all combine to contribute towards the attainment of a polyacrylate-modified polyvinyl chloride processing aid for ABS resins characterized by its excellent melt flow properties. Thus, these excellent melt flow properties appear to be directly attributable to the fact that the moieties derived from the methyl methacrylate, and from any optional comonomers which may also be present in the system, are consistently obtained in a substantially lower molecular weight than would otherwise be possible under conditions where (1) the unreacted vinyl chloride is not removed from the system; (2) the added catalyst is not pre-mixed with the MMA monomer, and any optional monomers, prior to being introduced into the system; and, (3) a chain transfer agent is not present in the system during the polymerization of the MMA and any optional comonomers.

Similarly, by controlling the rate of agitation and the concentration of the suspending agent that is present in the system during the initial polymerization of the PVC as well as during the subsequent polymerization of the acrylate ester monomer, it is now possible to readily control the size of the initially produced PVC particles, thereby greatly facilitating the absorption and the polymerization of the subsequently introduced MMA and any optional monomers. In the same manner, the size of the resulting polyacrylate-modified polyvinyl chloride particles is now readily maintained within the required limits so as to avoid producing them in too large a particle size thereby preventing "gell" or "fish-eye" or "grain-like" surface characteristics in the final ABS resin compositions wherein these processing aid particles have been included.

According to the preferred embodiment of the process utilized for preparing these processing aids, the acrylate ester monomer, i.e. the MMA and any optional monomers, is introduced into the system in a concentration of from about 20–100%, and preferably from about 25–66%, by weight, of the previously polymerized PVC. Thus, from about 10–60%, and preferably about 20–40%, by weight, of the resulting polyacrylate-modified polyvinyl chloride processing aid product will comprise moieties derived from the acrylate ester monomer, i.e. from the MMA and any optional monomers, while the polyvinyl chloride comprises from about 40 to 90%, and preferably about 60–80%, by weight, of the total weight of this product. It is important that the acrylate ester monomer which is employed should consist primarily of from about 80 to 100%, by weight of methyl methacrylate (MMA) but, as a minor monomer ingredient together with the MMA, up to about 20%, of the total acrylate ester monomer weight or 25% by weight of the MMA of one or more optional monomers may also be present. These optional monomers may be selected from the group consisting of the $C_2$–$C_3$ alkyl methacrylates, e.g. ethyl, n-propyl and 2-propyl methacrylate; the glycidyl esters of acrylic and methacrylic acid such as glycidyl methacrylate and glycidyl acrylate; the $C_1$–$C_{12}$ alkyl acrylates wherein the alkyl group may be straight or branched; or, mixtures of any two or more of the latter optional monomers. Especially preferred are mixtures of 80–100%, by weight, of methyl methacrylate with 20–0% of ethyl methacrylate, ethyl acrylate, and/or glycidyl methacrylate.

It has been found that by adding the polyacrylate-modified polyvinyl chloride processing aids thus obtained to ABS resins in a concentration of from about 1–10%, by weight, of the total mixture, the resultant compositions are easier to process than unmodified ABS resins. For example, when studied in a Brabender plastograph, the resulting easier processing resins are characterized by shortened flux times and higher shear torques. The polyacrylate-modified PVC processing aids which contain the preferred proportions of about 20 to 40 parts by weight MMA (with or without another optional monomer) to about 80 to 60 parts of polyvinyl chloride offer a substantial advantage over processing aids which are largely derived from acrylic polymers.

The process of preparing these polyacrylate-modified polyvinyl chloride processing aids comprises adding an appropriate amount of acrylate ester monomer, comprising methyl methacrylate with or without one or more optional comonomers, to a previously polymerized, aqueous suspension of polyvinyl chloride, particularly PVC obtained by means of a suspension polymerization process. In conducting such a suspension polymerization process for the preparation of PVC, the vinyl chloride monomer, or a mixture of vinyl chloride with a minor proportion of an appropriate comonomer such as vinyl acetate or a lower alkyl acrylate, is admixed with a concentration of from about 0.01 to 5.0%, as based on the weight of the total monomer mixture, of a suspending agent such, for example, as methyl cellulose, hydroxyethyl cellulose, hydroxypropyl cellulose, carboxymethyl cellulose, talc, clay, polyvinyl alcohol, gelatine and the like. As has already been noted, the particle size of the resulting PVC particles has been found to be affected by the concentration of the suspending agent that is present in the system. Thus, it is necessary to utilize a concentration of the selected suspending agent which is within the above stated limits. For example, if the latter maximum limit for the concentration of the suspending agent is substantially exceeded, the resulting PVC particles will be well below the required particle size range which, as will be further discussed hereinbelow, is in the range of from about 5 to 150 microns. Conversely, if the lower limit of this range is not met, the resulting PVC particles will be far too large.

In addition, a monomer soluble, free radical catalyst or initiator such, for example as 2,2'-azobisisobutyronitrile, lauroyl peroxide, benzoyl peroxide or isopropylperoxy dicarbonate should be present in the system in a concentration of from about 0.01 to 3%, by weight, of the total monomer charge being utilized for the polymerization of the PVC or vinyl chloride copolymer.

Polymerization may then be initiated by heating the above described recipe at a temperature in the range of from about 20 to 90° C. and for a period of from about 3 to 15 hours with agitation being applied throughout the course of the reaction. As was discussed hereinabove, with respect to the concentration of the suspending agent, the rate at which agitation is applied during the polymerization of the PVC is still another significant process variable which affects the particle size of the resulting PVC particles. Thus, if insufficient agitation is applied, the PVC particles will be far too large.

The size of these PVC particles is a critical feature of the process of preparing these processing aids. The reason is not entirely understood, but apparently the acrylate ester monomer, i.e. methyl methacrylate and any optional monomers, is somehow improperly absorbed by PVC particles which are substantially larger than the above stated maximum of 150 microns and it cannot, therefore, be effectively polarized.

Similarly, as has already been noted, it is necessary that the particles size of the final product, i.e. of the polyacrylate-modified polyvinyl chloride processing aids, be within certain limits. Thus, it is necessary that they should range in size from a minimum of about 10 microns up to a maximum limit such that no more than about 15%, by weight, are larger than about 150 microns. A preferred range is from about 40 to 150 microns. Thus, if the particles of processing aid are substantially smaller than the latter minimum size it will be extremely difficult to isolate them with conventional plant equipment. Conversely, if the maximum limit for the size of these processing aid particles is substantially exceeded, gells, "fisheyes," and the above described "applesauce" effect will be imparted to the processed ABS resin compositions containing such oversized processing aid particles.

In order to be able to attain this desired particle size in these novel processing aids, it is necessary to utilize the step of pre-mixing the acrylate ester monomer, i.e. the MMA and any optional comonomers, with the fresh catalyst prior to adding either of the latter ingredients to the previously prepared PVC.

Polymerization of the subsequently added acrylate ester monomer is initiated by a standard monomer soluble, i.e. oil-soluble, free radical initiating catalyst. Suitable catalysts include, 2,2'-azobisisobutyronitrile, lauroyl peroxide, benzoyl peroxide, t-butyl peroxy pivalate and isopropyl- peroxy dicarbonate. As has already been noted, hereinabove, one of the novel aspects of the process utilized for preparing these processing aids relates to the fact that it is essential to premix the additional free radical catalyst with the MMA, or with the MMA and any optional comonomers which are being utilized, prior to introducing either the catalyst or the MMA into the system in order to be able to attain a final product in which the MMA moieties have undergone the proper degree of conversion, i.e. in order to attain MMA moieties having the desired molecular weight range, so as to result in the preparation of polyacrylate-modified PVC processing aids having suitable melt flow characteristics. Thus, if the catalyst is not pre-mixed with the MMA monomer, the previously prepared PVC particles will tend to absorb MMA and the catalyst in a non-uniform manner.

Chain transfer agents are used during the polymerization of the MMA, and any optional monomers, in order to further control the melt flow properties of the resulting acrylate modified PVC processing aids. These chain transfer agents, can be selected from the group consisting of:

(1) Chlorinated aliphatic hydrocarbons such as carbon tetrachloride, chloroform, methylene chloride, butyl chloride, methyl chloroform, propylene chloride and trichlorethylene;

(2) Aromatic hydrocarbons such as toluene, xylene, mesitylene, cumene, ethyl benzene, t-butyl benzene and chlorobenzene;

(3) Aldehydes such as acetaldehyde, propionaldehyde, benzaldehyde and crotonaldehyde;

(4) Aliphatic and cyclic ketones such as methyl ethyl ketone, acetone, diethyl ketone, methyl isobutyl ketone and cyclohexanone methyl ethyl ketone;

(5) Cyclic ethers such as dioxane and tetrahydrofuran;

(6) Alkyl esters of aliphatic carboxylic acids such as methyl isobutyrate and ethyl acetate;

(7) Aliphatic alcohols such as sec-butyl alcohol, n-butyl alcohol, isobutyl alcohol and t-butyl alcohol;

(8) Aliphatic carboxylic acids such as acetic acid;

(9) Cyclic hydrocarbons such as methyl cyclohexane; and, most preferably

(10) Mono-, di- and polymercaptans including monomercaptans such as methyl mercaptan; ethyl mercaptan; propyl mercaptan; n-butyl mercaptan; n- and t-butyl mercaptan; n- and t-pentyl mercaptan; hexyl mercaptan; n- and t-heptyl mercaptan; n- and t-octyl mercaptan; n- and t-decyl mercaptan; n-dodecyl, i.e. lauryl, and t-dodecyl mercaptan; n- and t-tetradecyl mercaptan; n- and t-hexadecyl mercaptan; n- and t-octadecyl mercaptan; n- and t-eicosyl mercaptan; n- and t-pentacosyl mercaptan; n- and t-octacosyl mercaptan, n- and t-triconyl mercaptan and blends thereof. From this group of mono-mercaptans, it is preferred to use lauryl mercaptan.

Suitable dimercaptan chain transfer agents can be illustrated by ethanedithiol; 2,3-dimercaptopropanol; decanedithol-1,10 and the like.

Illustrative of low molecular weight polymeric materials having at least 3 pendant mercaptan groups per molecule are homopolymers and copolymers of vinyl thiol, e.g., polyvinyl thiol. Other polymeric thiols, such as glycerol/ethylene glycol polyether polymercaptan can also be used as chain transfer agents preparing these polyacrylate-modified polyvinyl chloride processing aids.

Suitable polymercaptans include the low molecular weight polymercaptans having from 3-5 mercaptan groups per molecule as illustrated by pentaerythritol tetrathioglycolate; pentaerythritol tetra-(3-mercaptopropionate); trimethylolethane tri-(3-mercaptopropionate); xylitol penta (beta-mercaptopropionate); trimethylolethane trithioglycolate; trimethylolpropane tri-(3-mercaptopropionate); and, trimethylolpropane triglycolate. The use of the latter polymercaptans are preferred since they are most efficient with respect to the rate of polymerization which is attainable in the system wherein they are utilized.

With respect to the amount of chain transfer agent which is used in the preparation of these processing aids, this will largely be determined by the particular chain transfer agent that is selected. However, in most instances they may be utilized in a concentration of from about 0.025-7.5%, as based on the total weight of the acrylate ester monomer charge, i.e. on the total weight of the MMA and any of the above identified optional monomers present in the monomer system. In general, mercaptans, and particularly polymercaptans, are more efficient and may be used in concentrations at the lower end of the latter range whereas less efficient chain transfer agents, such as the aromatic hydrocarbons, will be used in concentrations at the upper end of this range.

By utilizing a chain transfer agent in the preparation of these processing aids, it is possible to exercise a greater degree of control upon the molecular weight, i.e. to prevent the attainment of a high molecular weight, of that portion of the final polymeric product which is derived from the MMA and any optional comonomers which may have been introduced together therewith. This, in turn, affects the molecular weight of the product as a whole. Thus, it may be here stated that the products resulting from the process of this invention should, preferably, have a molecular weight, as expressed in terms of their Relative Viscosity, as determined in a 1%, by weight, solution of the polymer in cyclohexanone at 25° C., of from about 1.5-2.5 and, preferably, from about 1.90-2.15. Thus, it has been found that those products having a Relative Viscosity within this range will display optimum melt flow characteristics.

The polymerization of the acrylate ester monomer, i.e. of the MMA and of any optional comonomers which may have been introduced into the system therewith, is conducted by heating the system, i.e. the selected chain transfer agent, the previously prepared PVC host polymer and the mixture of the catalyst with the MMA and any optional comonomers, at a temperature of from about 40 to 100° C. for a time sufficient to completely polymerize the MMA, and any optional comonomers in and/or on the host PVC particles. It is to be pointed out that it is not ordinarily necessary to introduce any fresh suspending agent into the system since a sufficient quantity will already be present from the initial polymerization of the PVC.

The particular catalyst, temperature reaction time and other operating conditions chosen are, of course, interdependent and may be those ordinarily employed in the polymerization of MMA. Other variations in polymerization technique will suggest themselves to those skilled in the art.

The preparation of these processing aids is particularly satisfactory when conducted with polyvinyl chloride homopolymers as the initially prepared vinyl chloride host polymers. However, as has already been briefly noted, there can also be employed the usual copolymers of vinyl chloride with minor proportions of vinyl acetate and other ethylenically unsaturated monomer such as the lower, i.e. the $C_1$-$C_{12}$ alkyl acrylates, provided that the resulting vinyl chloride copolymers are within the above specified particle size and Relative Viscosity ranges.

It is essential, in the process of preparing these processing aids, that the PVC, or vinyl chloride copolymer, be first polymerized by the suspension technique until the reaction is at least 60% complete and preferably 80% or more complete. Unreacted vinyl chloride must then be removed when the system is vented before the MMA and any optional comonomers are subsequently added and polymerized. If this is not done, the remaining vinyl chloride monomer will undergo an undesirable copolymerization with the subsequently added MMA leading to nonreproducible results and to the preparation of a soft, rubbery product which often hardens before it can be removed from the reactor. This feature of sequential polymerization, i.e. of first polymerizing the vinyl chloride and then the MMA, is a unique and important aspect of this process.

The acrylate ester polymerzation, i.e. the polymerization of the MMA with or without one or more optional monomers, may be carried out in the same vessel immediately after the initial vinyl chloride suspension polymerization has been completed or the PVC may have been preformed, i.e. previously polymerized, stored and used at a later date in carrying out this second step of the process. If the acrylate ester monomer polymerization is carried out in situ as soon as the original PVC polymerization system has been vented and unreacted monomer removed, then it may not be necessary to add any additional catalyst. However, if additional catalyst is used, it must, as has been stressed hereinabove, be pre-mixed with the MMA and any optional comonomers which are introduced therewith.

The compositions resulting from the admixture of ABS resins with these polyacrylate-modified polyvinyl chloride processing aids can also include various optional additives which may include, for example, antioxidants such as hindered phenols, bisphenols and phenol sulfides and disulfides, and phosphites such as trisnonylphenyl phosphite along with polymeric phosphites normally used as free radical, oxygen and metal scavengers.

For a more complete discussion of applicable additives as ABS resin compositions, one may consult the above cited text by Basdekis.

The compositions resulting from the admixtures of types B and G ABS resins with the above described polyacrylate-modified PVC processing aids may be utilized in any of the coating, impregnating and molding applications known to those skilled in the art. For example, these compositions may be used for preparing such diverse items as calendered films, blow molded bottles and containers, extruded flat bed and blown films, extruded articles and tubing, etc. and in carrying out such processes as injection molding, fluidized bed coating, electrostatic powder spraying and rotational coating, etc.

The following examples are given to illustrate this invention but not in any way to limit its scope. In these examples, all parts given are by weight unless otherwise noted.

EXAMPLE I

This example illustrates the preparation of a polyacrylate-modified polyvinyl chloride processing aid and its use in preparing an ABS resin composition typical of the products of this invention.

Part 1

A 20 gallon Pflaudler reactor is charged with a standard recipe, as given below, for preparing suspension grade polyvinyl chloride. The polymerization is conducted at 60° C. for 5½ hours, with agitation being applied at a rate of about 300 r.p.m., resulting in the preparation of PVC particles having an average particle size of about 25-50 microns:

|  | Parts |
|---|---|
| Vinyl chloride | 221 |
| Water | 234 |
| Methyl cellulose | ¹ 50 |
| 2,2'-azobisisobutyronitrile (catalyst) | 0.144 |

¹ 1% aqueous solution.

Part 2

When the reaction of Part 1, hereinabove, is essentially complete (80-85% conversion) all of the excess vinyl chloride monomer is vented off whereupon 0.09 part lauryl mercaptan chain transfer agent followed by 90 parts of methyl methacrylate, which has first been pre-mixed with 0.063 part of additional 2,2'-azobisisobutyronitrile catalyst, are added. Under agitation at a rate of 300 r.p.m., the polymerization is allowed to proceed at 75° C. until the MMA is polymerized in and/or on the host PVC particles (about 5 hours). The resulting product has a Relative Viscosity, as determined under the conditions described hereinabove, of 2.00 and displays excellent melt flow properties when used as a processing aid for a type B and type G ABS resin. The particles size of this polyacrylate-modified PVC is such that no more than about 10.1%, by weight, is larger than about 150 microns.

EXAMPLE II

The procedure of Part 1 of Example I is repeated obtaining, in this instance, 210 parts by weight of suspension grade PVC, having a particle size between 50 and 80 microns, the PVC being suspended in 900 parts of water. After removing any unreacted vinyl chloride, there is subsequently added 0.20 part of pentaerythritol tetrathioglycolate followed by 90 parts of MMA which has first been pre-mixed with 0.18 part of lauryl peroxide. The monomer-catalyst mixture dissolve rapidly in the aqueous system while it is stirred and heated at 90° C. After 2 hours the MMA is polymerized in and/or on the host PVC polymer and the product analyzes as 76% PVC:24% PMMA. It has a Relative Viscosity of 1.90, as determined by the above described procedure, and a particle size such that no more than about 10%, by weight, of its particles are larger than about 150 microns. This material is an effective processing aid for a type B and a type G ABS resin, displaying excellent melt flow properties at a concentration level only one-half the total acrylate ester level of a commercial all-acrylate processing aid. The latter is more expensive than this new 76:24 PVC:PMMA composition, since the acrylate monomer is three to four times more costly than vinyl chloride.

EXAMPLE III

The procedure of Example II is repeated. However, in this instance the 90 parts of weight of MMA and 0.02 part of pentaerythritol tetrathioglycolate are replaced, respectively, with: (a) 5 parts of toluene and a mixture comprising 90%, by weight, of methyl methacrylate and 10%, by weight, of ethyl acrylate; (b) 2 parts of acetaldehyde and a mixture comprising 85%, by weight, of methyl methacrylate and 15%, by weight, of glycidyl methacrylate; and, (c) 3 parts of methyl ethyl ketone and a mixture comprising 80%, by weight, of methyl methacrylate and 20%, by weight, of ethyl methacrylate. Each of the latter monomer mixtures is first pre-mixed with 0.063 part of 2,2'-azobisisobutyronitrile prior to being combined with the previously prepared PVC. In each instance the ultimate product has a Relative Viscosity of about 2.00, as determined by the above described procedure, and their respective particle size is such that no more than about 10%, by weight, is larger than about 150 microns. Each product displays excellent melt flow when blended with a type B and a type G ABS resin at levels of 1 and 10% by weight and compared with a commercial all-acrylic processing aid at equal acrylic levels. Under standard milling conditions, the new products exhibit improved behavior both on the mill and in the finished sheets.

EXAMPLE IV

The procedure of Example I is repeated three times varying the amount of MMA, in each instance, so that the resulting products are: an 85:15 PVC:MMA polymer product, a 50:50 PVC:PMMA polymer product, and, an 80:20 PVC:PMMA polymer product. In each case, these products have a Relative Viscosity of about 2.10, as determined by means of the above described procedure and their particle size is such that no more than about 10%, by weight, are larger than about 150 microns. Type B and G ABS resin compositions containing these processing aids display excellent melt flow characteristics.

EXAMPLE V

This example illustrates the importance, in the preparation of the polyacrylate-modified polyvinyl chloride processing aids used in the process of this invention, of removing all of the unreacted vinyl chloride prior to the subsequent addition and polymerization of the MMA.

The procedure of Example I is repeated in all of its details. However, in this instance, any unreacted vinyl chloride monomer which is present after the initial polymerization is not vented off prior to adding and thereupon polymerizing the MMA. Under these conditions the reaction mass is observed to set-up, i.e. to coagulate, so that it prevents the preparation of the desired polyacrylate modified ponlyvinyl chloride processing aid.

In still another attempt to conduct this process without removing the unreacted vinyl chloride monomer, it is possible to avoid coagulation within the reactor. However, the resulting processing aid is found to provide poor results when blended with a type B and type G ABS resin since, under these conditions, the unreacted vinyl chloride copolymerizes with the MMA.

EXAMPLE VI

This example compares the results obtained, under identical conditions, with two ABS resin compositions one of which contains the processing aid whose preparation was described in Example I while the other contains a commercially available all-acrylic processing aid.

The following table describes the two processing aids containing ABS resin compositions evaluated. Both of these compositions also contain a dialkyl phenol-sulfide anti-oxidant and a stabilizer comprising a mixture of alkylated aryl phosphites. As a control, an ABS resin formulation is prepared which does not contain a processing aid.

|  | Formulation number | | |
|---|---|---|---|
|  | 1 | 2 | Control |
| A type G ABS resin of which 80%, by wt., comprises a 75:25 alpha-methyl styrene: acrylonitrile copolymer grafted onto an 85:15 butadiene:acrylonitrile copolymer; the latter butadiene copolymer comprising 20%, by wt., of the resin | 97 | 95 | 100 |
| "Acryloid K-147", a polyacrylic processing aid sold by the Rohm & Haas Co., said processing aid comprising a low molecular weight 90:10 methyl methacrylate:ethyl acrylate copolymer | 3 | | |
| The polyacrylate-modified PVC processing aid of Example I | | 5 | |
| Anti-oxidant | 0.5 | 0.5 | 0.5 |
| Stabilizer | 1.0 | 1.0 | 1.0 |

Each of the above described formulations is dry blended and then milled on a Farrel 6″ x 13″ two-roll plastic mill wherein the front roll is operating at a temperature of 335° F. while the back roll is operating at a temperature of 250° F. The shear rate is 1:1.4 based upon roll speed differential. The fluxing time required to obtain a clear band for formulations Nos. 1 and 2 is 1½ minutes while for the control it is more than 2.0 minutes.

Milled sheets having a thickness of about 25 mils are produced in this manner. The sheets derived from formulations Nos. 1 and 2 exhibit improved gloss and smoothness when compared to the sheet derived from the control. However, the milled sheet derived from formulation No. 2, which contains the polyacrylate modified polyvinyl chloride processing aid required for use in the process of this invention, has notably less discoloration than is exhibited by the sheet derived from formulation No. 1 which contains the all-acrylic processing aid.

Variations may be made in proportions, procedures and materials without departing from the scope of this invention as defined by the following claims.

What is claimed is:

1. An ABS resin composition having improved processing characteristics, said composition comprising an intimate admixture of an ABS resin with from about 1 to 10%, based on the total weight of said composition, of a plurality of particles of a polyacrylate-modified polyvinyl chloride processing aid, said processing aid comprising particles of polyvinyl chloride having polyacrylate ester moieties polymerized in and/or on said particles; said polyacrylate ester moieties consisting essentially of from about 80 to 100%, by weight, of polymethyl methacrylate together with from about 20 to 0%, by weight, of one or more optional methyl methacrylate copolymer moieties; said polyacrylate ester moieties being present in said processing aid particles in a concentration of from about 10–60%, by weight, of the polyvinyl chloride wherein said polyacrylate-modified polyvinyl chloride processing aid has a Relative Viscosity of from about 1.5–2.5 when determined, at 25° C., with a 1% solution of the polymer in cyclohexanone; wherein said optional methyl methacrylate copolymer moieties are selected from the group consisting of copolymers of methyl methacrylate with the $C_2$–$C_3$ alkyl methacrylates, copolymers of methyl methacrylate with the $C_1$–$C_{12}$ alkyl acrylates, copolymers of methyl methacrylate with the glycidyl esters of acrylic and methacrylic acid and mixtures of the latter copolymers; wherein the particles of said polyacrylate-modified polyvinyl chloride processing aid have a particle size in the range of from about 10 microns up to a maximum limit such that no more than about 15%, by weight, are larger than about 150 microns; said processing aid particles being prepared by means of a process which comprises: (1) first preparing particles of polyvinyl chloride by suspension polymerizing vinyl chloride monomer in the presence of from about 0.01 to 5%, by weight, of the vinyl chloride monomer, of a suspending agent with agitation being applied to the system; (2) removing unreacted vinyl chloride monomer from the system after polymerization of the vinyl chloride is at least about 60% complete; (3) adding to the suspension of polyvinyl chloride particles resulting from step (1) an effective concentration of a chain transfer agent and a solution of (a) an acrylate ester monomer consisting essentially of from about 80 to 100%, by weight, of methyl methacrylate together with from about 20 to 0%, by weight, of one or more optional monomers and (b) an effective concentration of at least one free radical initiating catalyst which is soluble in said acrylate ester monomer; said solution of acrylate ester monomer and catalyst having been pre-mixed prior to its addition to said suspension of polyvinyl chloride; said acrylate ester monomer being added to the system in a total amount to provide between about 20–100% of monomer, by weight of the polyvinyl chloride resulting from step (1); (4) suspension polymerizing the acrylate ester monomer in the presence of the mixture resulting from step (3) while applying agitation; and, (5) recovering the particles of polyacrylate-modified polyvinyl chloride resulting from step (4).

2. The composition of claim 1, wherein in said polyacrylate-modified polyvinyl chloride processing aid the polyacrylate ester moieties consist solely of polymethyl methacrylate.

3. The composition of claim 1, wherein in said polyacrylate-modified polyvinyl chloride processing aid the polyacrylate ester moieties comprise moieties of a 90:10 methyl methacrylate:ethyl acrylate copolymer.

4. The composition of claim 1, wherein in said polyacrylate-modified polyvinyl chloride processing aid the polyacrylate ester moieties comprise moieties of an 80:20 methyl methacrylate:ethyl methacrylate copolymer.

5. The composition of claim 1, wherein in said polyacrylate-modified polyvinyl chloride processing aid the polyacrylate ester moieties comprise moieties of an 85:15 methyl methacrylate:glycidyl methacrylate copolymer.

6. The composition of claim 1, wherein the particles of said polyacrylate modified polyvinyl chloride processing aid have a particle size in the range of from about 40 to 150 microns.

7. The composition of claim 1, wherein said ABS resin is a type B ABS resin.

8. The composition of claim 1, wherein said ABS resin is a type G ABS resin.

References Cited

UNITED STATES PATENTS

| | | | |
|---|---|---|---|
| 3,177,268 | 4/1965 | Frazer et al. | 260—876 |
| 2,746,944 | 5/1956 | Naps et al. | 260—884 X |
| 3,192,178 | 6/1965 | Basdekis et al. | 260—876 X |
| 3,562,235 | 2/1971 | Ryan | 260—884 X |
| 3,504,053 | 3/1970 | Williams | 260—884 |
| 2,924,545 | 2/1960 | Daly | 260—891 X |

JOHN C. BLEUTGE, Primary Examiner

U.S. Cl. X.R.

260—876 R, 884, 891